US008032758B2

(12) United States Patent
Tian (10) Patent No.: US 8,032,758 B2
(45) Date of Patent: *Oct. 4, 2011

(54) CONTENT AUTHENTICATION AND RECOVERY USING DIGITAL WATERMARKS

(75) Inventor: Jun Tian, Plainsboro, NJ (US)

(73) Assignee: Digimarc Corporation, Beaverton, OR (US)

( * ) Notice: Subject to any disclaimer, the term of this patent is extended or adjusted under 35 U.S.C. 154(b) by 12 days.

This patent is subject to a terminal disclaimer.

(21) Appl. No.: 12/138,198

(22) Filed: Jun. 12, 2008

(65) Prior Publication Data

US 2008/0276089 A1    Nov. 6, 2008

Related U.S. Application Data (63) Continuation of application No. 10/035,830, filed on Oct. 18, 2001, now Pat. No. 7,389,420.

(60) Provisional application No. 60/247,389, filed on Nov. 8, 2000, provisional application No. 60/260,907, filed on Jan. 10, 2001, provisional application No. 60/284,594, filed on Apr. 17, 2001.

(51) Int. Cl.
   *H04L 9/00*   (2006.01)
(52) U.S. Cl. .............................. 713/176; 726/26; 726/30
(58) Field of Classification Search .................. None
   See application file for complete search history.

(56) References Cited

U.S. PATENT DOCUMENTS

| | | |
|---|---|---|
| 4,750,173 A | 6/1988 | Bluthgen |
| 4,790,566 A | 12/1988 | Boissier et al. |
| 5,010,405 A | 4/1991 | Schreiber et al. |
| 5,146,457 A | 9/1992 | Veldhuis et al. |
| 5,327,237 A | 7/1994 | Gerdes et al. |
| 5,374,976 A | 12/1994 | Spannenburg |
| 5,384,087 A | 1/1995 | Scorey |
| 5,396,559 A | 3/1995 | McGrew |
| 5,613,004 A | 3/1997 | Moskowitz |
| 5,748,763 A | 5/1998 | Rhoads |
| 5,905,819 A | 5/1999 | Daly |
| 6,009,176 A | 12/1999 | Gennaro et al. |
| 6,064,764 A | 5/2000 | Bhaskaran et al. |
| 6,070,167 A * | 5/2000 | Qian et al. ............................ 1/1 |
| 6,095,566 A | 8/2000 | Yamamoto |
| 6,101,602 A * | 8/2000 | Fridrich ........................ 713/176 |
| 6,128,411 A | 10/2000 | Knox |
| 6,130,741 A | 10/2000 | Wen et al. |

(Continued)

FOREIGN PATENT DOCUMENTS

EP    1173001    1/2002

(Continued)

OTHER PUBLICATIONS

Ruiz et al. Digital Watermarking of Speech Signals for the National Gallery of the Spoken Word.IEEE, 2000[online], [retrieved on Aug. 20, 2009].Retrieved from Internet. IEEE Xplore.*

(Continued)

*Primary Examiner* — Minh Dinh
*Assistant Examiner* — Venkatanarayanan Perungavoor (57) ABSTRACT

The disclosure describes methods for using digital watermarking to authenticate digital media signals, such as images, audio and video signals. It also describes techniques for using embedded watermarks to repair altered parts of a media signal when alteration is detected. Alteration is detected using hashes, digital watermarks, and a combination of hashes and digital watermarks.

13 Claims, 4 Drawing Sheets

U.S. PATENT DOCUMENTS

| | | | |
|---|---|---|---|
| 6,170,060 | B1 | 1/2001 | Mott et al. |
| 6,192,138 | B1 | 2/2001 | Yamadaji |
| 6,201,879 | B1 | 3/2001 | Bender et al. |
| 6,215,421 | B1 | 4/2001 | Kondo et al. |
| 6,278,791 | B1 | 8/2001 | Honsinger et al. |
| 6,289,108 | B1 | 9/2001 | Rhoads |
| 6,332,030 | B1 | 12/2001 | Manjunath et al. |
| 6,353,672 | B1 | 3/2002 | Rhoads |
| 6,404,926 | B1 | 6/2002 | Miyahara et al. |
| 6,418,232 | B1 | 7/2002 | Nakano et al. |
| 6,448,485 | B1 | 9/2002 | Barile |
| 6,449,380 | B1 | 9/2002 | Acharya |
| 6,490,681 | B1 | 12/2002 | Kobayashi et al. |
| 6,504,941 | B2 | 1/2003 | Wong |
| 6,523,114 | B1 | 2/2003 | Barton |
| 6,546,139 | B1 | 4/2003 | Kondo et al. |
| 6,614,914 | B1 | 9/2003 | Rhoads et al. |
| 6,633,652 | B1 | 10/2003 | Donescu |
| 6,668,246 | B1 | 12/2003 | Yeung et al. |
| 6,671,407 | B1 | 12/2003 | Venkatesan et al. |
| 6,674,802 | B2 | 1/2004 | Knee |
| 6,674,874 | B1 | 1/2004 | Yoshida et al. |
| 6,687,383 | B1 | 2/2004 | Kanevsky et al. |
| 6,823,076 | B2 | 11/2004 | Cahill et al. |
| 6,839,844 | B1 | 1/2005 | Okano |
| 6,983,057 | B1 | 1/2006 | Ho |
| 2001/0021260 | A1 | 9/2001 | Chung et al. |
| 2001/0040980 | A1 | 11/2001 | Yamaguchi |
| 2001/0044899 | A1 | 11/2001 | Levy |
| 2001/0051941 | A1 | 12/2001 | Tonomura |
| 2001/0054146 | A1 | 12/2001 | Carro et al. |
| 2002/0013903 | A1 | 1/2002 | Le Floch |
| 2002/0027994 | A1 | 3/2002 | Katayama et al. |
| 2002/0040433 | A1 | 4/2002 | Kondo |
| 2002/0054680 | A1 | 5/2002 | Huang |
| 2002/0059059 | A1 | 5/2002 | Iliev |
| 2002/0059520 | A1 | 5/2002 | Murakami et al. |
| 2002/0066019 | A1 | 5/2002 | Amonou |
| 2002/0083324 | A1 | 6/2002 | Hirai |
| 2002/0106102 | A1 | 8/2002 | Au et al. |
| 2002/0114463 | A1 | 8/2002 | Pelly et al. |
| 2002/0136428 | A1 | 9/2002 | Sugahara |
| 2002/0154327 | A1 | 10/2002 | Jones |
| 2002/0164051 | A1 | 11/2002 | Reed et al. |
| 2002/0171853 | A1 | 11/2002 | Wu |
| 2002/0176602 | A1 | 11/2002 | Acharya |
| 2002/0191216 | A1 | 12/2002 | Umeda |
| 2002/0191856 | A1 | 12/2002 | Umeda et al. |
| 2002/0199106 | A1 | 12/2002 | Hayashi |
| 2003/0048921 | A1 | 3/2003 | Cahill et al. |
| 2003/0063319 | A1 | 4/2003 | Umeda et al. |
| 2003/0081809 | A1 | 5/2003 | Fridrich et al. |
| 2003/0097568 | A1 | 5/2003 | Choi |

FOREIGN PATENT DOCUMENTS

| | | |
|---|---|---|
| WO | WO 99/17537 | 4/1999 |
| WO | WO0188883 | 11/2001 |
| WO | WO0197128 | 12/2001 |
| WO | WO0250773 | 6/2002 |
| WO | WO 02/056264 | 7/2002 |
| WO | WO02056264 | 7/2002 |

OTHER PUBLICATIONS

Hartung et al. Fast Public-key Watermarking of Compressed Video. IEEE, 1997[online], [retreived on Aug. 19, 2009].Retrieved from the Internet. IEEE Xplore.*

Kundur et al. Improved robust watermarking through attack characterization. Optics Express, vol. 3, No. 12, 1998[online],[retrieved on 2009-19-2009]. Retrieved from the Internet. NPL Muti-Search <http://zj5Im7ny2a.cs.serialssolutions.com/>.*

Clark, Richard. An Introduction to JPEG2000 and Watermarking. IEEE Seminar on Secure Images and Image Authentication 2000/039. Apr. 10, 2000[online]. Retrieved IEEE Xplore.*

Tsekeridou, S. et al. Embedding Self-Similar Watermarks in the Wavelet Domain. IEEE 2000[online]. Retrieved on Jun. 12, 2010.*

Fridrich et al, "Invertible authentication," Proc. SPIE, vol. 4314, pp. 197-208, Jan. 2001.

Fridrich et al, "Invertible authentication watermark for JPEG images," Proc. IEEE Int'l Conf on Information Technology: Coding and Computing, pp. 223-227, Apr. 2001.

Fridrich et al, "Fragile Authentication Watermark for Images," ICIP 2000, Vancouver, Sep. 10-13, 2000.

Fridrich, "Methods for Tamper Detection in Digital Images," Proc. ACM Workshop on Multimedia and Security, Orlando, FL, Oct. 30-31, 1999, pp. 19-23.

Fridrich, "Visual Hash for Oblivious Watermarking," Proc. SPIE, vol. 3971 (2000), pp. 286-294.

Bartolini et al., "Image Authentication Techniques for Surveillance Applications," Proc. of IEEE, vol. 89, No. 10, Oct. 2001, pp. 1403-1418.

Bruckstein et al., A Holographic Transform Domain Image Watermarking Method, Circuits, Systems and Signal Processing, vol. 17, No. 3, pp. 361-389, 1998.

De Vleeschouwer et al., "Circular interpretation of histogram for reversible watermarking," IEEE Fourth Workshop on Multimedia Signal Processing, pp. 345-350, Oct. 2001.

Final Office Action on U.S. Appl. No. 10/035,830, mailed Sep. 14, 2007.

Final Office Action on U.S. Appl. No. 10/035,830, mailed Jan. 26, 2006.

Final Office Action on U.S. Appl. No. 10/035,830, mailed Dec. 6, 2006.

Goljan, et al., "Distortion-free Data Embedding," 4th Information Hiding Workshop, LNCS vol. 2137, pp. 27-41, Apr. 2001.

International Search Report for PCT/US01/032517, mailed Mar. 11, 2003.

International Preliminary Examination Report on PCT/US01/0032517, completed Aug. 18, 2004.

Komatsu, A Proposal on Digital Watermark in Document Image Communication and Its Application to Realizing a Signature, Electronics and Communications in Japan, Part 1, vol. 73, No. 5, pp, 22-33, 1990.

Marvel et al., "Compression-Compatible Fragile and Semi-Fragile Tamper Detection," Proc. of SPIE, vol. 3971 (2000), pp. 131-139.

Memon et al., "Distortion Bounded Authentication Techniques," Proc. of SPIE, vol. 3971 (2000), pp. 164-174.

Non-Final Office Action for U.S. Appl. No. 10/035,830, mailed Aug. 23, 2005.

Non-Final Office Action on U.S. Appl. No. 10/035,830, mailed Aug. 4, 2006.

Non-Final Office Action on U.S. Appl. No. 10/035,830, mailed May 9, 2007.

Notice of Allowance on U.S. Appl. No. 10/035,830, mailed Feb. 11, 2008.

Sun et al., "VQ-Based Digital Signature Scheme for Multimedia Content Authentication," Proc. of SPIE, vol. 3971 (2000), pp. 404-416.

Wong et al., Secret and Public Key Authentication Watermarking Schemes That Resist Vector Quantization Attack, Proc. of SPIE, vol. 3971 (2000), pp. 417-427.

* cited by examiner

CONTENT AUTHENTICATION AND RECOVERY USING DIGITAL WATERMARKS

RELATED APPLICATION DATA

This application is a continuation of application Ser. No. 10/035,830, filed Oct. 18, 2001 (now U.S. Pat. No. 7,389,420), which claims the benefit of U.S. Provisional Applications 60/247,389, filed Nov. 8, 2000, 60/260,907, filed Jan. 10, 2001, and 60/284,594, filed Apr. 17, 2001. The foregoing applications are hereby incorporated by reference.

TECHNICAL FIELD

The present technology relates to stenography, data hiding, and particularly, digital watermarking of multimedia signals.

BACKGROUND

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/645,779, filed Aug. 24, 2000 (now U.S. Pat. No. 6,714,683), 09/689,293, filed Oct. 11, 2000 (now U.S. Pat. No. 6,683,966), 09/503,881 filed Feb. 14, 2000 (now U.S. Pat. No. 6,614,914) and U.S. Pat. No. 5,862,260, which are hereby incorporated by reference.

SUMMARY

The present technology provides methods for embedding hidden data in media signals, and methods for extracting this embedded data to detect alteration of the signal as well as to repair the altered portion of the signal. One aspect of the technology is a method for hiding auxiliary data in a media signal. This method compresses a first media signal, and embeds the first media signal into a second media signal. In one implementation, the second media signal is part of the first signal, and the compressed part of the signal is extracted and used to repair altered portions of the media signal.

Another aspect of the technology is a method of decoding auxiliary data that has been imperceptibly embedded into a host signal. The method decodes the auxiliary signal, which represents a compressed version of the host signal. It then decompresses the compressed version, and uses the decompressed version to authenticate the host signal.

Another aspect of the technology is a method of digitally watermarking media content. The method selects non-overlapping blocks A, B and C of the media content; losslessly compresses blocks B and C of the content to form compressed content; watermark embeds the compressed content into block B of the media content to form a new block B'; creates a hash of block A and B'; watermark embeds the hash into block C to create a new block C'; and combines blocks A, B' and C' to form watermarked media content.

A compatible watermark decoder compares the hash with a new hash calculated from the watermarked media content to determine whether the watermarked media content is authentic. The decoder reconstructs original un-watermarked media content by using watermark decoding to extract the compressed content and decompressing the compressed content.

Another aspect of the technology is a method for encoding a reversible watermark in a media signal. The method embeds a watermark message signal into a reference media signal to create a watermarked reference signal, where the watermark message signal includes information about a watermark embedder function used to embed the watermark message signal into the reference signal. The method subtracts the reference signal from the watermarked reference signal to form a difference signal, and adds the difference signal to a host media signal to embed the watermark message signal in the host signal. The adding of the difference signal is reversible by decoding the information about the watermark embedder function from the host media signal, using the information about the watermark embedder function to re-compute the difference signal, and subtracting the difference signal from the host media signal to restore the host signal.

Another aspect of the technology is a method for authenticating a watermarked media signal that has been watermarked using a watermark embedding function on an un-watermarked version of the media signal. This method decodes a watermark message from the watermarked media signal, wherein the watermark message includes a hash of the un-watermarked media signal and watermark embedding information used by the watermark embedding function to create the watermarked media signal. It transforms the watermark embedding information and hash into a watermark difference signal using the watermark embedding function. It subtracts the watermark difference signal from the watermarked media signal to restore the un-watermarked media signal. The method computes a new hash of the restored, un-watermarked media signal, and compares the new hash with the hash decoded from the watermarked media signal to determine the authenticity of the watermarked media signal.

Further features of the invention will be more readily apparent from the following detailed description, which proceeds with reference to the accompanying drawings.

DETAILED DESCRIPTION

Authentication Watermarking Using Sorting Order Embedding To Embed a Compressed Bit Stream in Another Signal This section describes fragile and semi-fragile watermarking methods and related systems and applications. One method embeds a compressed bit stream into a host media signal. In particular, a watermark encoder embeds a compressed version of at least a part of the host media signal into the host signal. To authenticate a watermarked signal, a compatible decoder extracts the watermark to recover the compressed version and decompresses it. The decompressed signal may be compared with the watermarked signal to detect alteration.

This section also describes a sorting order watermark embedding method and compatible decoder. In this method, an embedder modulates the sorting order of selected sets of samples in a media signal to encode auxiliary information in that signal. The decoder analyzes the sorting order of the sets of samples, and maps the sorting orders to a corresponding message symbols.

The following sections present a fragile watermarking method for media signal authentication. The method creates a hash of a host media signal, such as a digital image, and embeds the hash back into the host signal. In particular, one implementation employs a compressed bit stream as the hash and embeds the bit stream into the signal by a sorting order embedder.

While other forms of hashes may be used, compression tools are particularly useful for generating a hash of a signal for use in authenticating that signal. For image signals, the image compression tools (for example, the image compression standard JPEG 2000) available today achieve exceptional compression performance. Even at a very low bit rate, the compression tools provide good image quality, both subjectively and objectively.

To authenticate a signal using the compressed signal as a hash, a watermark decoder first extracts the compressed bit stream. Next, the decoder constructs a decompressed signal from the bit stream. By comparison of the signal to be authenticated and the constructed decompressed image, one can tell whether or not the image is authentic or altered.

If the signal is not authentic, the decoder can also locate the altered region and recover that region from the constructed decompressed signal.

The following sections illustrate a watermarking implementation for authenticating images. In this implementation, the embedder computes the hash of the host image using the image compression standard JPEG 2000. JPEG 2000 is a wavelet-based image compression system. For more information see, M. J. Gormish, D. Lee, and M. W. Marcellin, "JPEG 2000: Overview, architecture, and applications," in Proceedings of the International Conference on Image Processing, September 2000. D. Taubman, E. Ordentlich, M. Weinberger, G. Seroussi, I. Ueno, and F. Ono, "Embedded block coding in JPEG 2000," in Proceedings of the International Conference on Image Processing, September 2000. W. Zeng, S. Daly, and S. Lei, "Point-wise extended visual masking for JPEG-2000 image compression," in Proceedings of the International Conference on Image Processing, September 2000.

JPEG 2000 can compress several different types of still images (bi-level, gray-level, color) with different characteristics (natural images, scientific, medical, military imagery, text, and rendered graphics). Its compression performance is a significant improvement over discrete cosine transform (DCT) based JPEG. G. Wallace, "The JPEG still picture compression standard," Communications of the ACM, vol. 34, no. 4, pp. 30-44, 1991.

In JPEG 2000, a discrete wavelet transform (DWT) first decomposes an image into spatial frequency subbands. See, Stephane Mallat, "A theory of multiresolution signal decomposition: the wavelet representation," IEEE Transactions on Pattern Analysis and Machine Intelligence, vol. 11, no. 7, pp. 675-693, 1989.

Each subband is then partitioned into several blocks. Each block is coded independently into embedded block bit stream by the EBCOT algorithm. See, D. Taubman, "High performance scalable image compression with EBCOT," IEEE Transactions on Image Processing, July 2000. The EBCOT algorithm quantizes the wavelet coefficients, groups the quantization bits by context modeling, and uses the MQ binary arithmetic coder to further compress the bit stream. Finally the output of MQ coder from all blocks are collected into packets to form the JPEG 2000 bit stream.

Besides its exceptional compression performance, JPEG 2000 provides quality scalability, resolution scalability, and spatial scalability. In addition, a lower bit rate image can be constructed by truncating the bit stream of a higher bit rate.

In fragile watermarking applications, the watermark is designed to detect changes in the signal in which it is embedded. One approach is to create a hash of the host signal and embed the hash back into the host signal. The hash size should not be too large since it will tend to degrade the quality of the signal in which it is embedded. However, to increase the accuracy of authentication, the hash should be as large as possible.

The implementation makes this tradeoff and takes advantage of the compression performance of JPEG 2000 by using the compressed bit stream from JPEG 2000 as the hash of a digital image.

The implementation of the embedding process is as follows.

1. Compress the digital image to a low bit rate.
2. Take the compressed bit stream as a binary message and embed the binary message into the original digital image.

The implementation of the authentication process is as follows.

1. Extract the compressed bit stream from the image.
2. Construct a decompressed image from the bit stream.
3. Compare the decompressed image and the image to be authenticated.
4. If the image is found altered, locate and recover the altered region by the constructed decompressed image.

A detailed example of the embedding and authentication processes is explained below.

As an example, we apply the watermarking method presented above to an image. In this example, the image is compressed at a compression ratio 32:1 and the compressed bit stream is embedded in the spatial domain. As such, on average, one message bit of information is embedded into every four pixels.

The embedder uses a sorting order method to embed one message bit into a 2 by 2 block of pixels. The sorting order embedder sorts all pixels values in the block. In a 2 by 2 block, there are 81 possible sorting orders. The embedder partitions all possible sorting orders into two groups, S1 and S0. If the message bit to be embedded is 0, and the current sorting order is in S0, no action is needed. If the sorting order is in S1, the embedder modifies these four pixel values so that the new sorting order will be in S0. The message bit "1" is embedded similarly.

After each of the compressed bit stream is embedded, the result is a watermarked image in which the watermark is imperceptible.

To authenticate the watermarked image, the compressed bit stream is extracted from the sorting order decoder and a decompressed image is constructed. If the watermarked image has been modified after watermarking, the modification can be detected by comparing the image to be authenticated and the decompressed image. In addition, the altered region can be located and recovered from the decompressed image.

Based on the preceding description, the following points can be made:

In the JPEG 2000 bit stream, some header information (such as the size of the image) can be discarded since it can be set to the same size as the host image being authenticated. This will reduce the hash size.

As an alternative to embedding in blocks of samples in the spatial domain, the compressed bit stream can be embedded in a transform domain as well, such as the wavelet domain, Fourier domain, DCT, etc.

The sorting order embedder is not restricted to embedding auxiliary data symbols in the spatial domain. It can also be employed in a transform domain.

The compressed bit stream may be modulated by a pseudo random binary sequence before it is embedded.

The watermarking method can be modified to be robust against JPEG 2000 compression (up to a chosen compression ratio). Since the JPEG 2000 is an embedded coding, a lower bit rate image can be constructed by truncating the bit stream of a higher bit rate. Thus, the embedder can embed the hash into the selected quantization bits in the wavelet domain, and an inverse DWT will give the watermarked image.

The embedding and decoding of the watermarking method can be done blockwise. In such an approach, the blockwise embedder divides the host signal into N by M blocks, compresses each block and embeds the bit stream into another block.

This method can also be used to hide one media signal into another (such as one image into another).

The compression process can be used to encode other types of watermark messages. For example, if the watermark is a binary message, one could compress the binary message by entropy coding to reduce its size (thus increases the hiding capacity). Error correction code (ECC) such as convolution codes or BCH codes may be used to encode the watermark message. If an error correction coding is applied to the binary message before embedding, then the compression will be employed before ECC.

Authentication Watermarking Enabling Recovery of the Original Un-Watermarked Content The disclosure describes a method of watermarking content, particularly images, in a manner that enables authenticity of the content to be verified (e.g., determine whether the content has been altered) and also enables the original un-watermarked content to be re-constructed.

The following description details a watermark embedding method, a corresponding authentication and recovery method, and an example implementation. The watermark embedding method is as follows:

[1] Divide the digital image I into three non-overlapping regions A, B, and C. For example, A could be a spatial block, a frequency band, the six most significant bits, etc.

[2] Losslessly compress B and C, and use a watermark encoding process to store the compressed bit stream in B, which results in a new B'. Examples of lossless compression techniques include, for example, entropy coding methods like Huffman coding, arithmetic coding, etc.

[3] Create a hash of A and B', and use a watermark encoding process to store the hash in C, which results a new C'. Examples of hashes include secure hashes like SHA-1.

[4] Combining A, B', and C' gives the watermarked image.

The authentication and recovery method is as follows:

[1] For a digital image i to be authenticated, divide it into three non-overlapping regions a, b, and c, as in the first step of embedding.

[2] Create the hash of a and b, and compare it with the hash decoded from c using a watermark decoding process compatible with the encoding process. If they are exactly the same, i is classified as authenticated.

[3] If i is authenticated, decompress the watermark embedded into b by first decoding the watermark in b and then decompressing the watermark to derive b' and c'.

[4] Combine a, b', and c'. We claim it is the original, unwatermarked image.

One implementation of the above (embedding) method is as follows:

[1] We define a haar transform of two integers m and n $$a = \text{round}((m+n)/2), b = m-n.$$

For example, if m=150, n=81, we have $$a = \text{round}((150+81)/2) = \text{round}(231/2) = 116$$

$$b = 150 - 81 = 69$$

As it can be easily seen, we can retrieve m and n from a and b.

[2] For a digital image, we apply the haar transform row by row, then column by column, as like a one level wavelet transform. We can also define the low frequency L (from the a part) and high frequency H (from the b part), as in a wavelet domain.

[3] We take the LL (the average part from a) as region A.

[4] We take the last 160 bits from HH as region C.

[5] We take the LH, HL, and HH except the last 160 bits as region B.

[6] Arithmetic coding on all bits from LH, HL, and HH, and store the compressed bit stream in B.

[7] Run the secure hash algorithm on A and B, and generate a 160-bit hash.

[8] Store the 160-bit hash in C.

Appendix A of application 60/260,907 includes source code in MatLab format for the watermark embedding and decoding implementation described above.

Before applying lossless compression in [6], the implementation prepares the integer coefficients, x, for lossless compression as follows:

Sign(x)=1, when x>=0.

Sign(x)=0, when x<0.

The absolute value of x (abs(x)) is set to abs(x)+1. The resulting number is represented as a binary sequence, $b_1 b_2 \ldots b_n$, where $b_i = 0, 1$. Since $b_1$ is always 1, the implementation does not code $b_1$.

In other words, $b_1 b_2 \ldots b_n$ is represented as $b_2 \ldots b_n$.

The new binary string, $b_1 b_2 \ldots b_n$, is used as input to the lossless coding process, which in this implementation is an arithmetic coder described in "Arithmetic coding for data compression", I. H. Witten, R. Neal, and J. G. Cleary, Communications of the ACM, 30:520-540, June 1987, which is hereby incorporated by reference. An example source code implementation of the arithmetic coder is provided in this paper.

In decoding, the inverse of the lossless coding method is used to reconstruct $b_2 \ldots b_n$, which is then used to reconstruct x by performing the inverse of the method described above.

Content Authentication and Recovery from Tampering Using Embedded Compressed Bit Streams This section describes a method for authenticating a media signal and for restoring regions of the signal when tampering has been detected.

To illustrate the method, we use the example of a digital image, though it also applies to other media signal types like audio and video signals. The method determines whether local regions of an image have been altered, and if so, recovers the tampered regions.

There are two components to the method: the embedder and the detector. The embedder calculates a hash of an input digital image, and embeds the hash into the digital image. The detector re-computes the hash of a suspect image, extracts the hash from the image, and finally, compares the re-computed and extracted hashes. If they differ, it proceeds to recover tampered regions. A more detailed description of an implementation follows below.

The embedder partitions a digital image into two non-overlapping regions. The first region is relatively large compared to the second, and contains most of the perceptually important visual content. The second region is smaller and contains almost no perceptually important visual content.

The embedder embeds a hash of the first region into the second region. Preferably the hash should have the following attributes:

Unique—identical images produce identical hashes

Capacity—the hash should be small so that it will not degrade the quality of the image when embedded into the second region Confidence—if two images have the same hash, they should be perceptually similar (no visual differences)

Invariance—the hash of the image before and after embedding should be the same

In one implementation, the embedder divides the image into blocks, then partitions each block into regions (namely, region I and region II). One example partitioning is to separate the most significant bits from the least significant bits (e.g., for an 8 bit per pixel image, region I comprises the 7 most significant bits and region II comprises the least significant bit). Next, it compresses region I of each block to compute a hash for that block. In particular, it performs a JPEG 2000 compression of region I. It then embeds the compressed bit stream of region I of a block (a source block) into region II of one or more different blocks (the target block(s)). This process is repeated for each block such that each block carries the compressed bit stream of one or more other blocks.

One example implementation uses a JPEG 2000 compression ratio of 32:1 to create the hash, but the actual compression ratio chosen can vary depending on data hiding capacity, image quality, and confidence level. For added security, the hash (namely, the compressed bit stream) is modulated by a pseudo random binary sequence.

The embedding process proceeds as follows:
1. partition region II of a block into N sub-regions;
2. for each source block, compute a fragile hash of the compressed bit stream of the source block;
3. for each source block, compute N permutations, where the permutations map N−1 instances of the compressed bit stream of the source block and the fragile hash of the source block to N corresponding sub-regions in target blocks;
4. Embed the compressed bit streams and fragile hash into region II of selected target blocks by replacing bits in corresponding sub-regions of region II with N−1 permutations and one fragile hash.

The fragile hash is referred to as "fragile" because even slight modifications of the data input to the hash create different hash outputs. Examples include MD4, MD5, SHS, a check sum, etc. In one implementation, the embedder computes the fragile hash of the modulated, compressed bit stream for the source block.

The number of sub-regions of region II may vary. In one implementation where the compression ratio is 32:1, we use 4 sub-regions. As such, there are three redundant instances of the compressed bit stream for each block, and one fragile hash. Generally speaking, the embedder embeds repeated instances of a first hash (the compressed bit stream), and one or more instances of a fragile hash of the first hash. We refer to the first hash as the "redundant hash."

To authenticate a suspect image, a detector reverses the embedding process. It proceeds as follows:
1. Divides the suspect image into blocks as in the embedder;
2. Partition each block into region I and region II as in the embedder;
3. In each block, compress region I (JPEG 2000 compression at the same compression ratio as the embedder);
4. Modulate the compressed bit stream of step 3 with the same pseudo random number sequence used in the embedder;
5. Use the permutation to find the target blocks carrying the N−1 versions of the compressed bit stream for each source block, and the fragile hash of the source block; and
6. Evaluate the authenticity by comparing the N−1 versions of the compressed bit stream and fragile hash.

There are a number of possible schemes for verifying the authenticity using the redundant hashes (e.g., the compressed bit streams) and the fragile hash (the hash of the redundantly embedded hash). In one implementation, the detector compares each of the extracted redundant hashes for a block with the re-computed hash for that block and signals that tampering has occurred when at least one of the extracted hashes does not match the re-computed hash.

In this implementation, there are three possibilities when the detector finds tampering:
1. one of the N−1 target blocks or the source block (excluding its LSBs) has been tampered;
2. The LSBs of one of the N−1 target blocks has been tampered; or
3. Both 1 and 2 have occurred.

The fragile hash of the source block serves as a guide for recovering the original image data of the tampered target block. When there is a mis-match between the re-computed version of the redundant hash and one or more of the embedded redundant hashes for a source block, the detector extracts the embedded fragile hash and compares it with the fragile hash of each of the redundant hashes for the source block as well as the fragile hash of the re-computed hash. If the embedded fragile hash matches the fragile hash of the re-computed hash of the source block, then the MSBs of the source block have not been altered. However, tampering has occurred in the LSBs of the target blocks for which the fragile hash does not match.

If the embedded fragile hash does not match the fragile hash of the source block, but does match the fragile hash of one or more of the embedded hashes for that block, then the MSBs of the source block have been altered. Any one of the compressed bit streams with matching fragile hashes can then be used to reconstruct the MSBs of the source block. In particular, the compressed bit stream extracted from one of the target blocks is decompressed and used to replace the MSBs of the source block.

If the embedded fragile hash does not match the fragile hash of the re-computed hash or the fragile hash of any of the embedded redundant hashes, then the detector forms a new bit stream for the source block by combining the compressed bit stream for that block and the embedded bit streams for that block. One way to combine these data sets is to pick the bit value for each bit that occurs most frequently. If the compressed bit stream for the source block does not match the stream formed by combining these data sets, then the stream formed from combining the data sets can be decompressed to reconstruct an approximation of the original source block.

There are number of possible variations to this process. For example, the redundant hashes for a particular block can be used as an error correction code, where the redundant hashes are extracted from the target blocks and combined to form a single composite hash. This composite hash can be used to reconstruct the source block when the detector determines that it has been altered using the analyses described above. Either the composite hash or the individual instances of the redundant hash may be compared with the recomputed hash to detect alteration. Further, the extracted fragile hash can then be compared with the fragile hash of the source block, and the fragile hash of the composite hash or the individual instances of the redundant hash to detect alteration.

While the above technique is illustrated for images, it may also be applied to video and audio signals. For example, the same technique may be applied to video frames. Also, the technique may be applied to a digital audio signal by segmenting the audio signal into blocks, partitioning those blocks into regions, and compressing the first region of each block and embedding it into the second region of one or more other blocks.

The above technique may also be applied to compressed bit streams representing images, video or audio. For example, the compressed bit stream is segmented into blocks, and the blocks are partitioned into regions, one region containing perceptually relevant information, and another region containing less perceptually relevant information. A hash or compressed version of the first region of each block is then embedded into one or more of the second regions of other blocks.

Reversible Watermarking and Authentication of Media Signals

The following description details a digital watermarking process where the watermark embedding process is reversible from the standpoint that it enables recovery of the original unmodified host signal. The particular method described below inserts information about the embedding function into a watermark message payload. The payload includes two components: the watermark message (which includes a hash of the host image for authentication applications) and the embedding function information. In the watermark detection stage, when the payload is successfully decoded, it unveils the embedding function information. Based on such information, the watermarked image (or other media content like audio, video) undergoes the reverse of the embedding procedure to remove the watermark and derive the original, un-watermarked image.

The following is an example of an implementation for a grayscale image using a watermark embedder plugin of the Adobe Photoshop program from Digimarc Corporation:

Embedding:

[1] For an image X, create a hash H of X. The hashing function could be the secure hashing algorithm, (SHA-1), 2-D hashing, compressed bit stream, etc.

[2] Create a mid-gray image G with all pixel values being 128. This image G serves as a reference signal.

[3] Watermark G using the Adobe Photoshop watermark embedder plugin, where the payload consists of H and the watermark durability. If the watermark durability is fixed at some constant known to the detector, e.g., 1 (or another constant), then the watermark durability does not need to be put into payload. Assume the watermarked image is G'.

[4] Define $$X'=X+G'-G$$

The subtraction of the reference signal G from the watermarked reference signal G' gives a watermark difference signal, $D=G'-G$.

As an alternative to steps [1-4], the implementer may create a difference signal by the following steps:

[a] form the watermark message from the hash, watermark embedder information (a gain value), and error detection bits (e.g., CRC bits),

[b] perform error correction encoding of the message (such as convolution encoding, BCH encoding, etc.),

[c] multiplying or XORing the resulting binary number with a binary antipodal pseudorandom sequence generated from a key seed number to form a spread spectrum signal, and

[d] mapping the spread spectrum signal into a two dimensional image and multiplying the image pixel values by the gain value to form a watermark difference signal D.

[5] X' will be the watermarked image of X.

Detection:

[1] Use the Digimarc watermark reader plugin in Adobe Photoshop to detect a possibly watermarked image X'.

Alternatively, the implementer may create a watermark reader compatible with the alternative embedder described above:

[a] cross correlate the watermarked image with the pseudorandom sequence mapped into an image to decode estimates of error correction encoded bits.

[b] perform error correction decoding of the message bit estimates (such as convolution encoding, BCH encoding, etc.).

[c] use decoded error detection bits to check for errors to determine if valid message is present. If so, the detection process has succeeded.

[2] If [1] of the detection process has succeeded, watermark the mid-gray image G with the decoded payload. Assume the watermarked image is G''. Alternatively, create a watermark difference signal, D', from the decoded payload using embedder steps [4] [a-d].

[3] Define $$X''=X'+G-G'' (X''=X'-D')$$

[4] Compare the hash from the decoded payload with the hash of X''.

[5] If the hash match exactly, then X'' (and equivalently X') is authenticated and X'' is also the original, un-watermarked image.

The discrete values of a digital media signal are usually bounded in a fixed range. For example, in an eight bit grayscale image, the pixel value is an integer between 0 and 255. Thus, when the embedder adds a watermark difference signal D to an image X, it takes into account the overflow and underflow problems. The overflow refers to the case when the pixel value is above the upper limit (which will be larger than 255 in a eight bit grayscale image); the underflow refers to the case when the pixel value is below the lower limit (which will be lower than 0 in a eight bit grayscale image).

In the embedding stage, when an overflow (or underflow) happens at some pixel, the embedder records the pixel location and the overflow (or underflow) value, which is the difference between the upper (or lower) limit and the pixel value. For example, after adding the watermark difference signal D, if the pixel value x' is 256, then the embedder records the location of x' and the overflow value 1, and changes the value of x' to 255; Similarly if the pixel value x" is −1, then the embedder records the location of x" and the underflow value −1, and changes the value of x" to 0.

The watermark embedding is processed block by block, where the image is subdivided into contiguous rectangular blocks of pixels. The overflow and underflow locations and values of one block are stored in the payload of another block. Such overflow and underflow information can also be employed for authentication, since the pixel values at overflow locations must be 255 in the case of eight bit grayscale, and the pixel values at underflow locations must be 0 in the case of eight bit grayscale.

In one implementation, the overflow and underflow pixel locations and values for a first image block are included as part of the watermark embedder information in the watermark payload embedded in a second image block, such as a neighboring block, or a block that has a relationship with the first block specified by a key. This key may be an index to the first block embedded in the second block, or an offset specifying the position of the block from which the data originated. At decoding, the decoder decodes the payload information, including the overflow/underflow information, and uses this information to restore the original image after decoding step [3] and before authentication step [4].

After correcting for overflow/underflow errors for a particular block, the decoder then recomputes the hash of the restored image block and compares it with the hash decoded from the watermark payload. If the hash does not match, the image block is not authentic. Otherwise, it is deemed authentic. This process is repeated for other watermarked blocks in the image to check their authenticity.

A watermarked block of samples may carry the overflow/underflow data for more than one other block, as long as the data in that watermark payload specifies from which other block that data originated (e.g., using a block index or offset). Also, if the watermark embedder strength is uniform across an image or part of an image, it need not be carried in every block. Instead, one block can carry the strength parameter that applies to many blocks, along with a parameter indicating the blocks to which that parameter should be applied. In this manner, watermark control parameters for two or more blocks may be stored in the watermark payload of a single block. This block based embedding of control parameters enables the watermark control parameters to vary from block to block across the host signal.

This technique may be extended to other media types, including audio and video, as well as other watermark embedder/detector methods.

Figure 1:
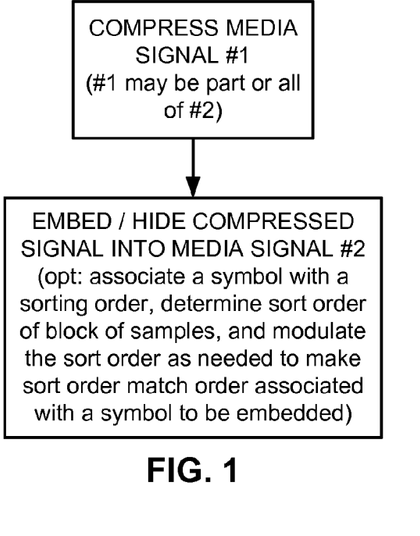
FIGS. 1-9 are flowcharts illustrating aspects of various embodiments of the detailed technology.
Figure 2:
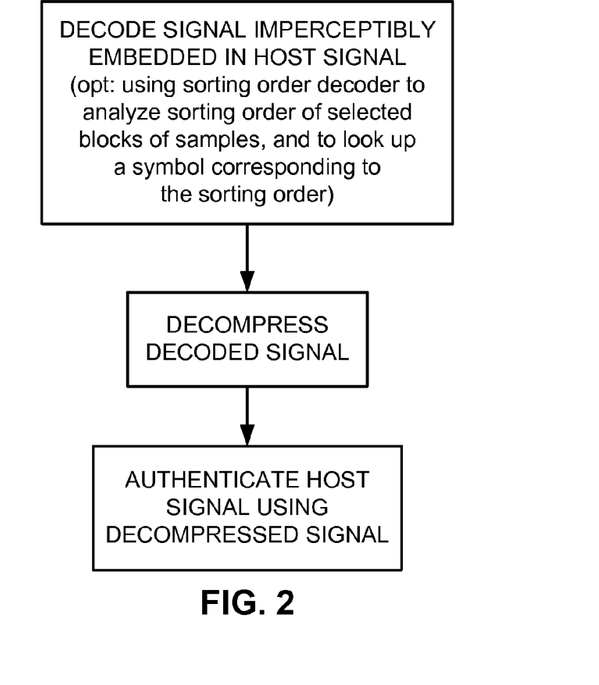
Figure 3:
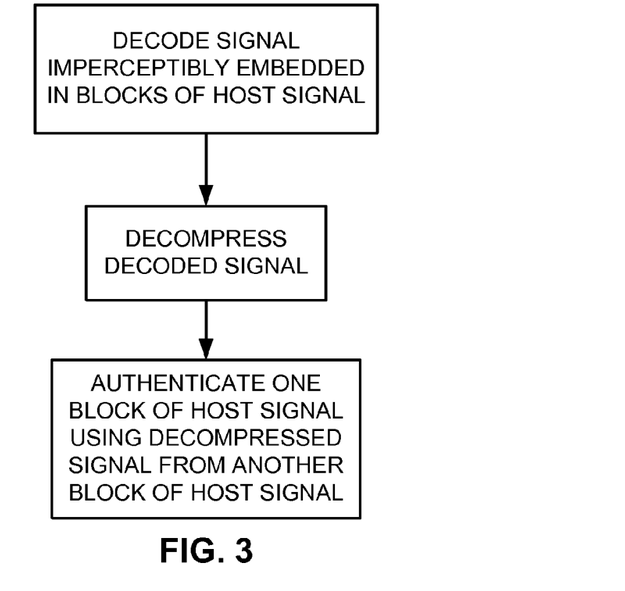
Figure 4:
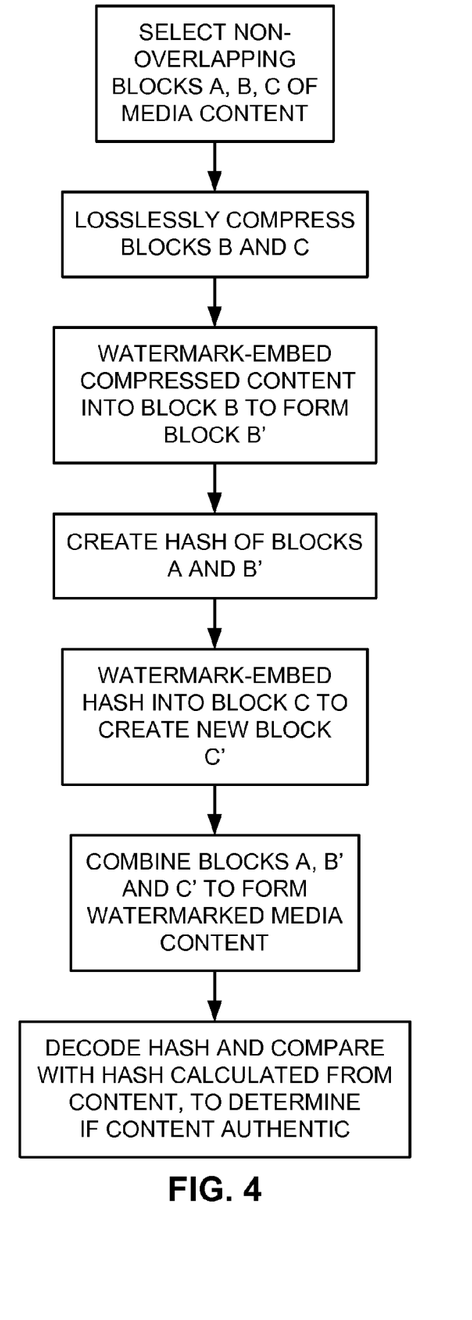
Figure 5:
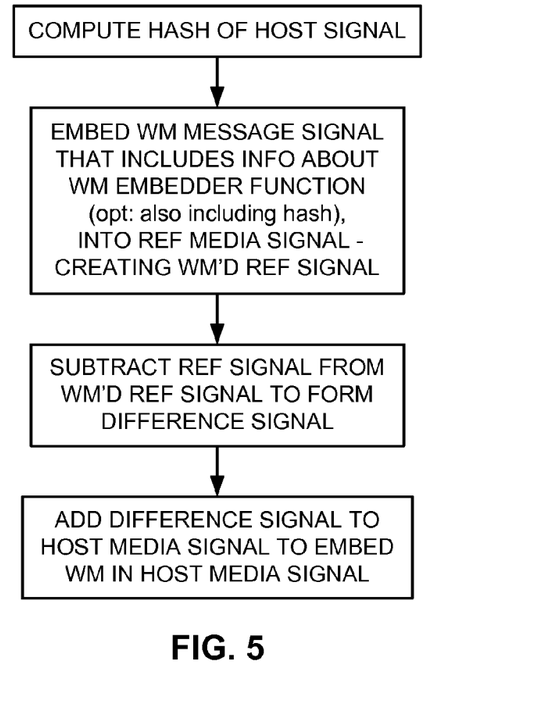
Figure 6:
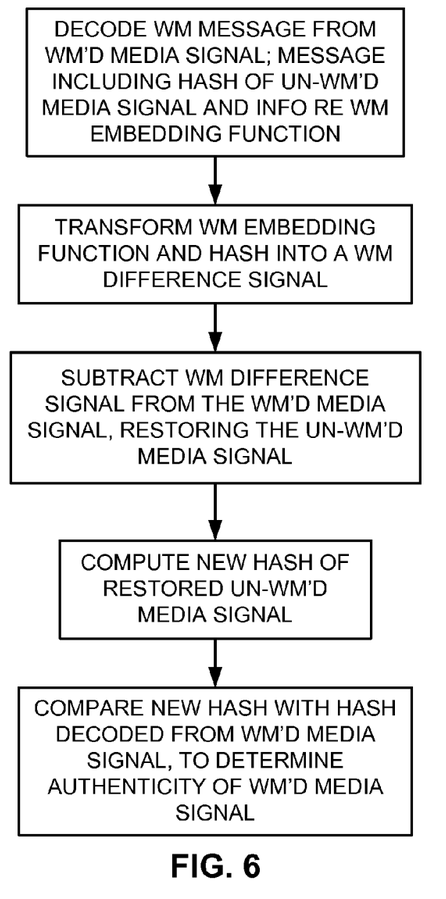
Figure 7:
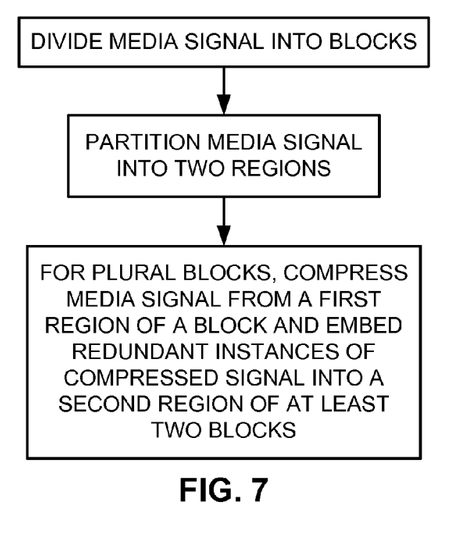
Figure 8:
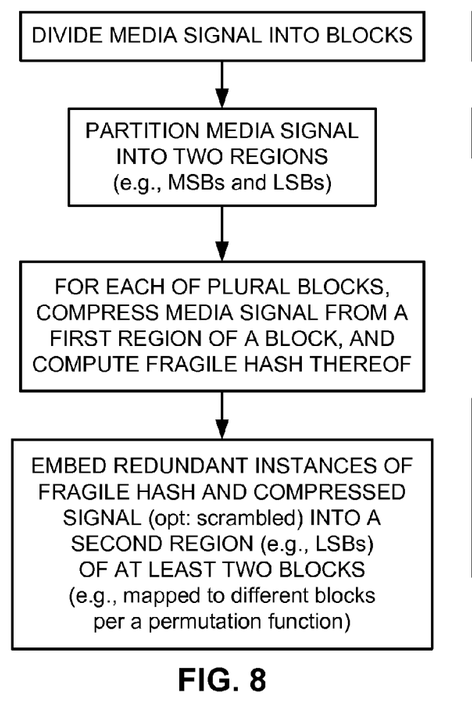
Figure 9:
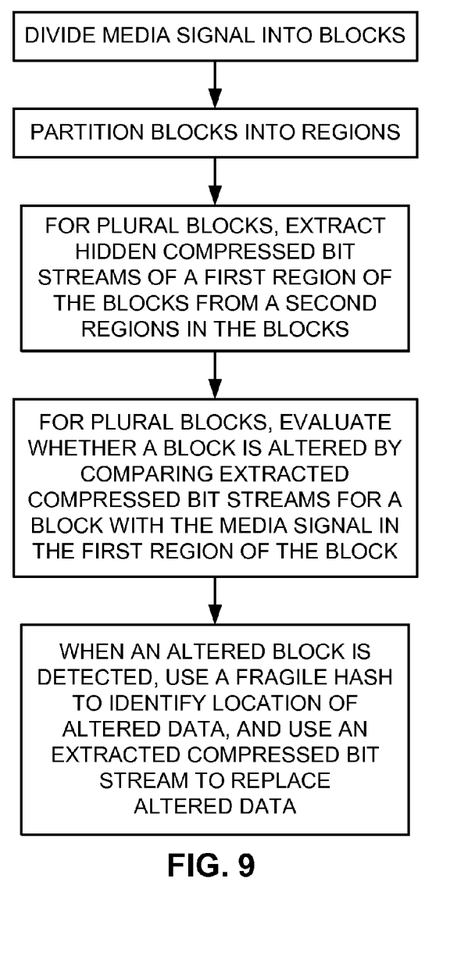
Figure 10:
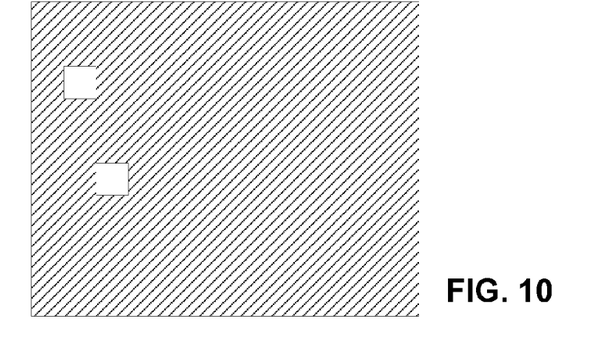
FIG. 10 shows how embodiments of the detailed technology can identify areas of image tampering.

Aspects of the foregoing embodiments are illustrated by the flowcharts of FIGS. 1-9. FIG. 10 is a conceptual illustration showing how regions of tampering in an image (shown in white) can be identified, using the foregoing methods.

Concluding Remarks

Having described and illustrated the principles of the technology with reference to specific implementations, it will be recognized that the technology can be implemented in many other, different, forms. For example, the method may be applied to other data types, like audio, video and geometric models for computer generated graphics, etc. To provide a comprehensive disclosure without unduly lengthening the specification, applicants incorporate by reference the patents and patent applications referenced above.

While the present technology is illustrated with reference to images, it also applies to other media types including audio. In the case of audio, the signal hash may be computed from and embedded into temporal blocks of an audio signal. The watermark embedding may modulate features in the time, frequency, or some other transform domain of the host audio signal block.

In addition to a hash, the watermark may be used to convey other information, such as an identifier of the content, an index to related metadata, rendering control instructions, etc. For example, the watermark can carry a network address or index to a network address to link the watermarked signal to a network resource such as a related web site. Some blocks may be used to carry a hash, while others may be used to carry other payload information, such as metadata, or a pointer to metadata stored in an external database.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A tangible computer-readable medium having instructions stored thereon, the instructions comprising:
    instructions to decode an auxiliary signal imperceptibly embedded into a host signal, wherein the host signal represents a first content object;
    instructions to decompress the decoded auxiliary signal to yield a signal representing a second content object; and
    instructions to compare the first and second content objects for perceptual similarity, to authenticate the host signal.

2. A method comprising:
    Joint Photographic Experts Group (JPEG)-compressing media data; and
    embedding data resulting from the JPEG-compressing into the media data, using a hardware processor, wherein the media data comprises audio or visual information, and wherein the embedding comprises altering the media data to steganographically encode the data resulting from the JPEG-compressing therein.

3. The method of claim 2, wherein the JPEG-compressing comprises JPEG2000 compressing.

4. A method comprising:
    identifying a first set of data, a second set of data, and a third set of data within processed host data;
    calculating a hash of the first and second sets of data using a hardware processor;
    decoding auxiliary data imperceptibly embedded in the second set of data;
    decoding auxiliary data imperceptibly embedded in the third set of data;
    combining the auxiliary data decoded from the second set of data with auxiliary data in the first set of data to yield a new set of host data; and determining the new set of host data to be authenticated if the calculated hash matches the auxiliary data decoded from the third set of data.

5. The method of claim 4, wherein the determining is performed using the hardware processor.

6. The method of claim 1, wherein the host signal comprises audio or visual data, and wherein the audio or visual data has been altered to imperceptibly embed the auxiliary signal therein.

7. An apparatus comprising:
a decoder configured to decode an auxiliary signal imperceptibly embedded into a host signal, wherein the host signal represents a first content object,
wherein the decoder is further configured to decompress the decoded auxiliary signal to yield a signal representing a second content object, and
wherein the decoder is configured to compare the first and second content objects for perceptual similarity, to authenticate the host signal.

8. A tangible computer-readable medium having instructions stored thereon, the instructions comprising:
instructions to divide a received media signal into blocks;
instructions to extract hidden compressed bit streams of a first region of a block from a second region in the block;
instructions to evaluate whether the block is altered by comparing the extracted compressed bit streams for the block with the media signal in the first region of the block; and
if an altered block is detected by the comparison, instructions to use a hash to identify a location of altered data, and use an extracted compressed bit stream to replace the altered data.

9. A watermarking system comprising:
a decoder configured to receive a first set of data representing a first content object and generate a second set of data representing a second content object that is perceptually similar to the first content object; and
an encoder configured to digitally watermark the second set of data into the first set of data.

10. The watermarking system of claim 9, wherein the first and second content objects comprise images, and wherein the decoder is configured to apply a wavelet-based compression technique to the first set of data to yield the second set of data.

11. The watermarking system of claim 9, wherein the first set of data comprises a group of plural samples, wherein the group has an initial sorting order,
wherein the second set of data comprises a plurality of symbols, and
wherein the encoder is configured to associate the plurality of symbols with a corresponding sorting order, determine if the initial sorting order of the group matches the corresponding sorting order, and, if not, alter the group of samples to have the corresponding sorting order.

12. The watermarking system of claim 11, wherein the encoder is configured to determine and alter other symbols in the second set of data.

13. A tangible computer-readable medium having instructions stored thereon, the instructions comprising:
instructions to Joint Photograph Experts Group (JPEG)-compress media data; and
instructions to embed data resulting from the JPEG-compressing into the media data, wherein the media data comprises audio or visual information, and wherein the embedding includes altering the media data to steganographically encode the data resulting from the JPEG-compression therein.

* * * * *

UNITED STATES PATENT AND TRADEMARK OFFICE
CERTIFICATE OF CORRECTION

| | | |
|---|---|---|
| PATENT NO. | : 8,032,758 B2 | |
| APPLICATION NO. | : 12/138198 | |
| DATED | : October 4, 2011 | |
| INVENTOR(S) | : Tian | |

It is certified that error appears in the above-identified patent and that said Letters Patent is hereby corrected as shown below:

Title page, item (56), under "Other Publications", in Column 2, Line 2, delete "Word.IEEE," and insert -- Word. IEEE, --.

Title page, item (56), under "Other Publications", in Column 2, Line 3, delete "2009].Retrieved" and insert -- 2009]. Retrieved --.

Page 2, item (56), under "Other Publications", in Column 1, Line 2, delete "[retreived" and insert -- [retrieved --.

Page 2, item (56), under "Other Publications", in Column 1, Line 2, delete "2009].Retrieved" and insert -- 2009]. Retrieved --.

Page 2, item (56), under "Other Publications", in Column 2, Line 2, delete "1998[online],[retrieved" and insert -- 1998[online], [retrieved --.

Page 2, item (56), under "Other Publications", in Column 2, Line 4, delete "[<http://zj5Im" and insert -- <http://zj5Im --.

Page 2, item (56), under "Other Publications", in Column 2, Line 5, delete "JPEG2000" and insert -- JPEG 2000 --.

Page 2, item (56), under "Other Publications", in Column 2, Line 38, delete "LNCS vol. 2137," and insert -- LNCS, vol. 2137, --.

Column 12, line 55, in Claim 3, delete "JPEG2000" and insert -- JPEG 2000 --.

Column 14, line 26, in Claim 13, delete "Photograph" and insert -- Photographic --.

Signed and Sealed this
Seventeenth Day of April, 2012

David J. Kappos
*Director of the United States Patent and Trademark Office*